(12) United States Patent
Quackenbush

(10) Patent No.: US 6,540,293 B1
(45) Date of Patent: Apr. 1, 2003

(54) CHILD RESTRAINING SEAT

(76) Inventor: Raymond E. Quackenbush, 12500 NE. 72nd Ave., Vancouver, WA (US) 98686

( * ) Notice: Subject to any disclaimer, the term of this patent is extended or adjusted under 35 U.S.C. 154(b) by 0 days.

(21) Appl. No.: 09/658,749

(22) Filed: Sep. 8, 2000

(51) Int. Cl.⁷ .................................................. A47C 1/08
(52) U.S. Cl. ............................ 297/256.13; 297/256.16; 297/250.1; 297/476; 297/479
(58) Field of Search .................. 297/250.1 B, 476–480, 297/256.13–256.17, 216.16, 250.12

(56) References Cited

U.S. PATENT DOCUMENTS

| | | | |
|---|---|---|---|
| 4,711,490 A | 12/1987 | Brand | |
| 4,768,828 A | 9/1988 | Kohketsu | |
| 4,915,446 A | * 4/1990 | Darling et al. ............... | 297/250 |
| 5,286,085 A | 2/1994 | Minami | |
| 5,383,708 A | 1/1995 | Nagasaka et al. | |
| D366,965 S | 2/1996 | Meeker et al. | |
| 5,810,435 A | 9/1998 | Surot | |
| 5,947,556 A | * 9/1999 | Strojny ................... | 297/256.16 |
| 5,971,479 A | * 10/1999 | Jacquemot et al. .... | 297/256.14 |
| 6,000,753 A | * 12/1999 | Cone, II ................. | 297/256.16 |
| 6,193,311 B1 | * 2/2001 | Payton ................... | 297/256.15 |
| 6,199,949 B1 | * 3/2001 | Dasilva ................. | 297/256.12 |
| 6,299,249 B1 | * 10/2001 | Mori ...................... | 297/256.13 |

* cited by examiner

Primary Examiner—Carl D. Friedman
Assistant Examiner—Yvonne M. Horton

(57) ABSTRACT

A child seat includes a seating member, a base member, seating member lock and a connecting member. The seating member is designed to abut the body of a child. The base member has an outside surface that is designed to abut a seat of a vehicle. A connecting surface of the base member is designed to selectively abut the seating member. The seating member is pivotally coupled to the base member. The seating member lock is used for selectably securing the seating member to the base member. The seating member lock is coupled to an upper end of the base member and is selectably engaged to an upper end of the seating member. A connecting member is used for coupling the base member to a seatbelt of the vehicle. The connecting member is coupled to the base member. The connecting member is selectably coupled to the seat belt of the vehicle.

12 Claims, 3 Drawing Sheets

CHILD RESTRAINING SEAT

BACKGROUND OF THE INVENTION

1. Field of the Invention

The present invention relates to seats designed to restrain children in a moving vehicle and more particularly pertains to a new child restraining seat for easily securing a child to the seat of a vehicle with the use of the vehicle's seatbelt.

2. Description of the Prior Art

The use of seats designed to restrain children in a moving vehicle is known in the prior art. More specifically, seats designed to restrain children, in a moving vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,383,708; U.S. Pat. No. 5,810,435; U.S. Pat. No. 5,286,085; U.S. Pat. No. 4,711,490; U.S. Pat. No. 4,768,828; and U.S. Pat. No. Des. 366,965.

While these devices fulfill their respective, particular objectives and requirements, the aforementioned patents do not disclose a new child restraining seat. The inventive device includes a seating member, a base member, seating member lock and a connecting member. The seating member has a first surface that is designed to abut the body of a child. The seating member further has a second surface that is positioned opposite the first surface. Moreover, the seating member has an upper end and a lower end. The base member has an outside surface that is designed to abut a seat of a vehicle. The base member further has a connecting side that is positioned opposite the outside surface. The base member also has an upper end, a lower end and a medial portion that is positioned in between the upper end and the lower end of the base member. The connecting surface of the base member is designed to selectively abut the second surface of the seating member.

Moreover, the lower end of the seating member is pivotally coupled to the lower end of the base member. The seating member lock is used for selectably securing the upper end of the seating member to the upper end of the base member. The seating member lock is coupled to the upper end of the base member and is selectably engaged to the upper end of the seating member. In addition, the connecting member is used, for coupling the base member to the seat of the vehicle. The connecting member is coupled to the connecting side of the base member proximate the medial portion of the base member. The connecting member is selectably coupled to a seatbelt of the vehicle.

In these respects, the child restraining seat according to the resent invention substantially departs from the conventional concepts and designs of the prior art, and in so doing provides an apparatus primarily developed for the purpose of easily securing a child to the seat of a vehicle with the use of the vehicle's seatbelt.

SUMMARY OF THE INVENTION

In view of the foregoing disadvantages inherent in the known types of seats designed to restrain children in a moving vehicle now present in the prior art, the present invention provides a new child restraining seat construction wherein the same can be utilized for easily securing a child to the seat of a vehicle with the use of the vehicle's seatbelt.

The general purpose of the present invention, which will be described subsequently in greater detail, is to provide a new child restraining seat apparatus and method which has many of the advantages of the seats designed to restrain children in a moving vehicle mentioned heretofore and many novel features that result in a new child restraining seat which is not anticipated, rendered obvious, suggested, or even implied by any of the prior art seats designed to restrain children in a moving vehicle, either alone or in any combination, thereof.

To attain this, the present invention generally comprises a seating member, a base member, seating member lock and a connecting member. The seating member has a first surface that is designed to abut the body of a child. The seating member further has a second surface that is positioned opposite the first surface. Moreover, the seating member has an upper end and a lower end. The base member has an outside surface that is designed to abut a seat of a vehicle. The base member further has a connecting side that is positioned opposite the outside surface. The base member also has an upper end, a lower end and a medial portion that is positioned in between the upper end and the lower end of the base member. The connecting surface of the base member is designed to selectively abut the second surface of the seating member.

Moreover, the lower end of the seating member is pivotally coupled to the lower end of the base member. The seating member lock is used for selectably securing the upper end of the seating member to the upper end of the base member. The seating member lock is coupled to the upper end of the base member and is selectably engaged to the upper end of the seating member. In addition, the connecting member is used for coupling the base member to the seat of the vehicle. The connecting member is coupled to the connecting side of the base member proximate the medial portion of the base member. The connecting member is selectably coupled to a seatbelt of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child restraining seat apparatus and method which has many of the advantages of the seats designed to restrain children in a moving vehicle mentioned heretofore and many novel features that result in a new child restraining seat which is not anticipated, rendered obvious, suggested, or even implied by any of the prior art seats designed to restrain children in a moving vehicle, either alone or in any combination thereof.

It is another object of the present invention to provide a new child restraining seat which may be easily and efficiently manufactured and marketed.

It is a further object of the present invention to provide a new child restraining seat which is of a durable and reliable construction.

An even further object of the present invention is to provide a new child restraining seat which is susceptible of a low cost of manufacture with regard to both materials and labor, and which accordingly is then susceptible of low prices of sale to the consuming public, thereby making such child restraining seat economically available to the buying public.

Still yet another object of the present invention is to provide a new child restraining seat which provides in the apparatuses and methods of the prior art some of the advantages thereof, while simultaneously overcoming some of the disadvantages normally associated therewith.

Still another object of the present invention is to provide a new child restraining seat for easily securing a child to the seat of a vehicle with the use of the vehicle's seatbelt.

Yet another object of the present invention is to provide a new child restraining seat which includes a seating member, a base member, seating member lock and a connecting member. The seating member has a first surface that is designed to abut the body of a child. The seating member further has a second surface that is positioned opposite the first surface. Moreover, the seating member has an upper end and a lower end. The base member has an outside surface that is designed to abut a seat of a vehicle. The base member further has a connecting side that is positioned opposite the outside surface. The base member also has an upper end, a lower end and a medial portion that is positioned in between the upper end and the lower end of the base member. The connecting surface of the base member is designed to selectively abut the second surface of the seating member.

Moreover, the lower end of the seating member is pivotally coupled to the lower end of the base member. The seating member lock is used for selectably securing the upper end of the seating member to the upper end of the base member. The seating member lock is coupled to the upper end of the base member and is selectably engaged to the upper end of the seating member. In addition, the connecting member is used for coupling the base member to the seat of the vehicle. The connecting member is coupled to the connecting side of the base member proximate the medial portion of said base member. The connecting member is selectably coupled to a seatbelt of the vehicle.

Still yet another object of the present invention is to provide a new child restraining seat that provides safety for children riding in a vehicle.

Even still another object of the present invention is to provide a new child restraining seat that secures the child seat to the seat of a vehicle without other hold-down devices.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
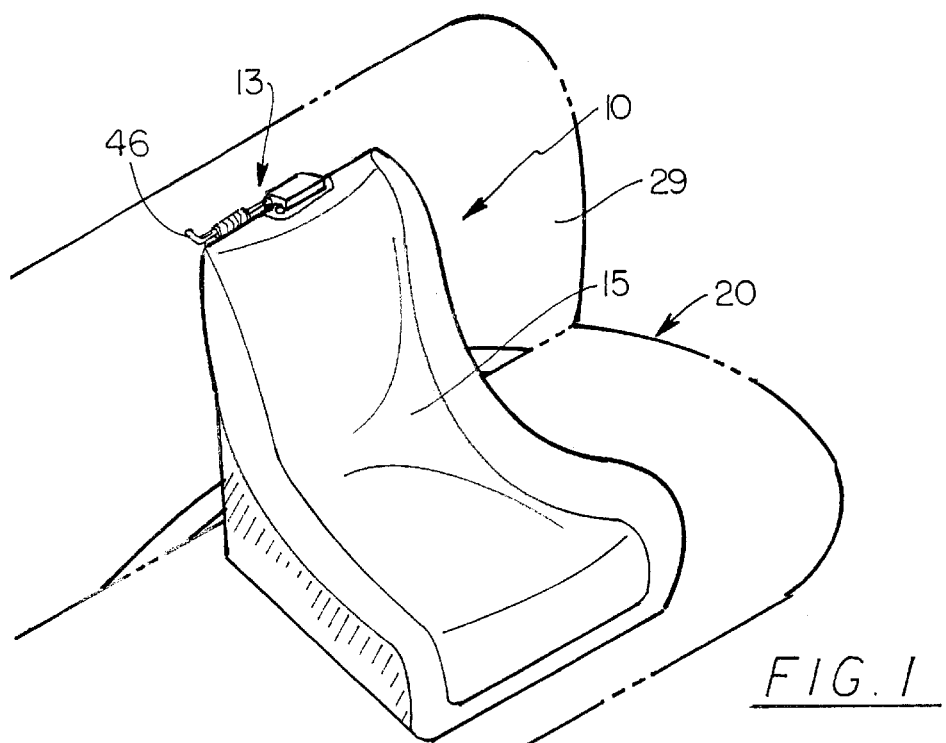
FIG. 1 is a schematic perspective view of a new child restraining seat according to the present invention.
Figure 2:
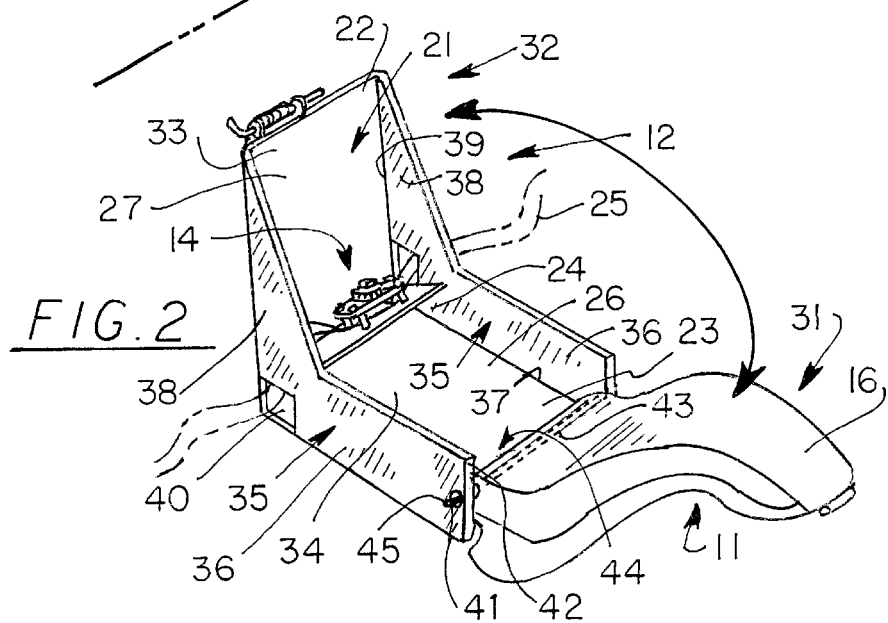
FIG. 2 is a schematic perspective view of the present invention illustrating the seating member in the connecting position.
Figure 3:
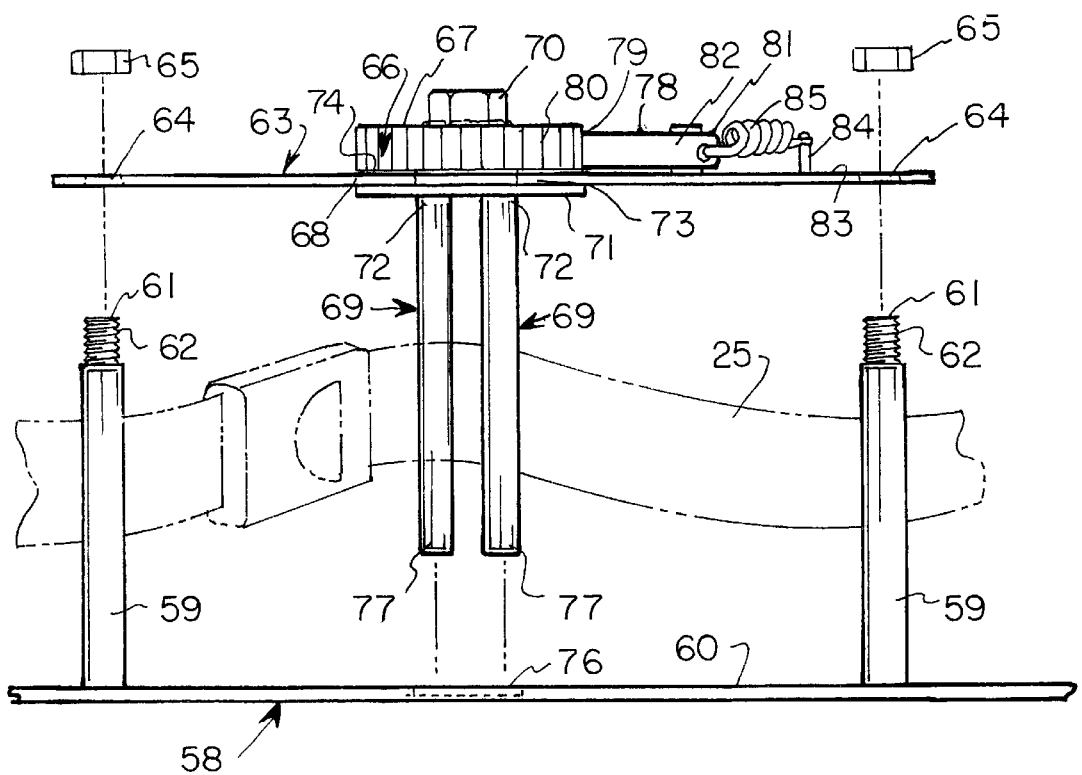
FIG. 3 is a schematic front exploded view of the connecting member of the present invention.
Figure 4:
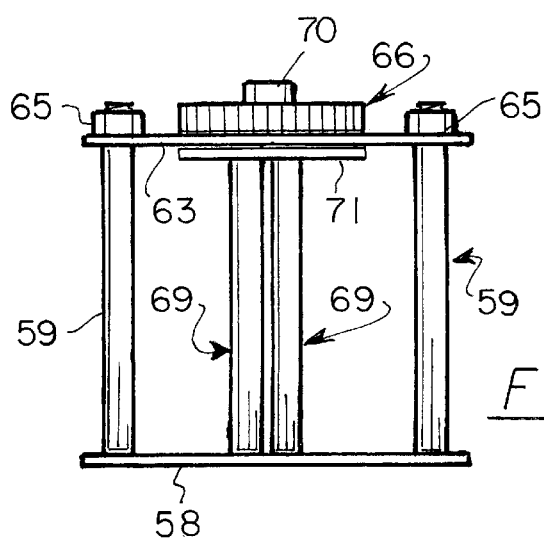
FIG. 4 is a schematic front view of the connecting member of the present invention.
Figure 5:
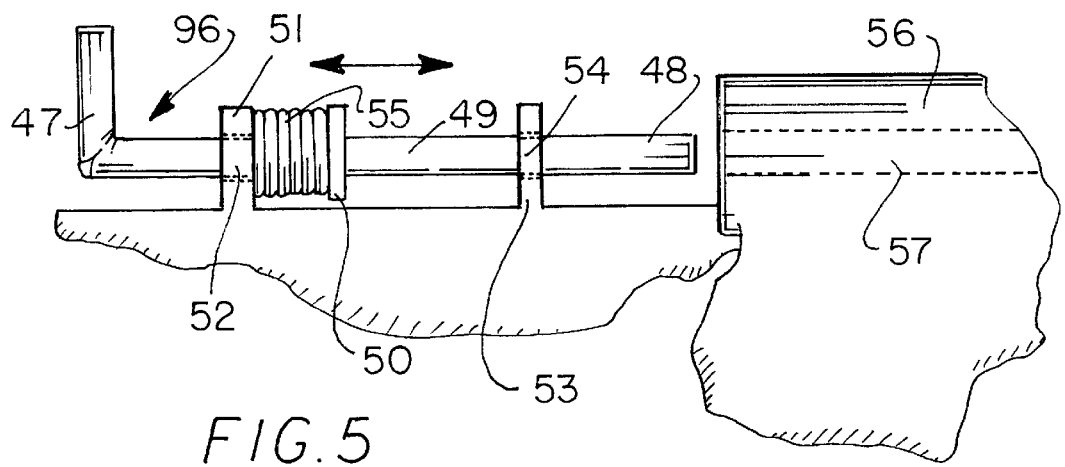
FIG. 5 is a schematic front view of the seating member lock of the present invention.
Figure 6:
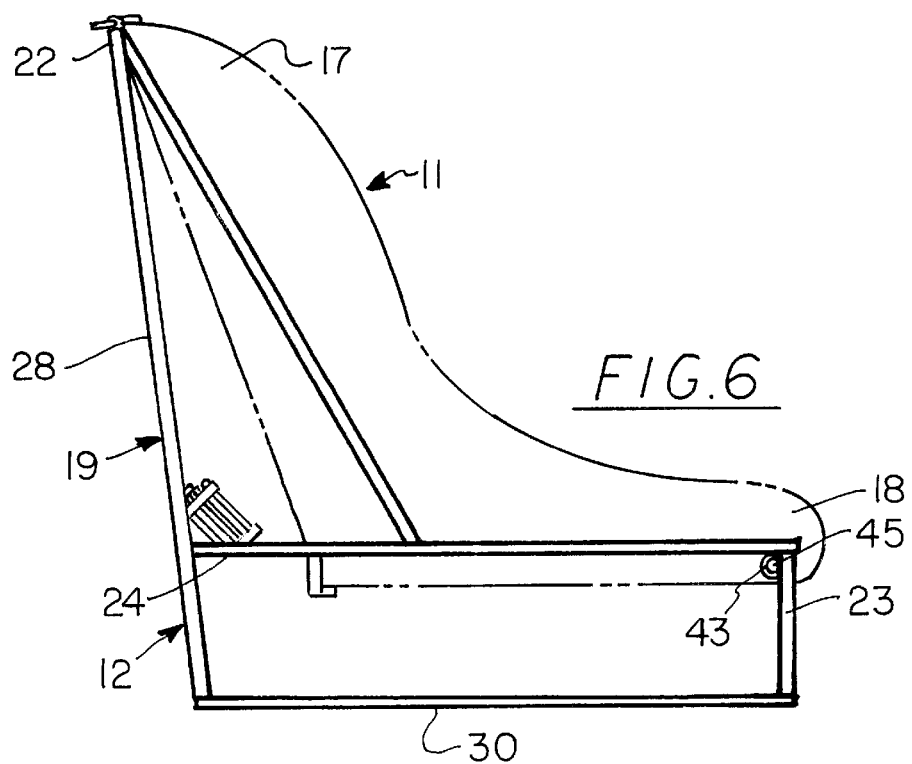
FIG. 6 is a schematic side view of the present invention.

With reference now to the drawings, and in particular to FIGS. 1 through 6 thereof, a new child restraining seat embodying the principles and concepts of the present invention and generally designated by the reference numeral 10 will be described.

As best illustrated in FIGS. 1 through 6, the child restraining seat 10 generally comprises a seating member 11, a base member 12, a seating member lock 13 and a connecting member 14. The seating member 11 has a first surface 15 that is designed to abut the body of a child. The seating member 11 further has a second surface 16 that is positioned opposite the first surface 15. Moreover, the seating member 11 has an upper end 17 and a lower end 18. The base member 12 has an outside surface 19 that is designed to abut a seat 20 of a vehicle. The base member 12 further has a connecting side 21 that is positioned opposite the outside surface 19. The base member 12 also has an upper end 22, a lower end 23 and a medial portion 24 that is positioned in between the upper end 22 and the lower end 23 of the base member 12.

Various conventional securing means (not shown) for securing the child to the seat member 11 may be used.

The connecting side 21 of the base member 12 is designed to selectively abut the second surface 16 of the seating member 11. Moreover, the lower end 18 of the seating member 11 is pivotally coupled to the lower end 23 of the base member 12. The seating member lock 13 is used for selectably securing the upper end 17 of the seating member 11 to the upper end 22 of the base member 12. The seating member lock 13 is coupled to the upper end 22 of the base member 12 and is selectably engaged to the upper end 17 of the seating member 11. In addition, the connecting member 14 is used for coupling the base member 12 to the seat 20 of the vehicle. The connecting member 14 is coupled to the connecting side 21 of the base member 12 proximate the medial portion 24 of said base member 12. The connecting member 14 is selectably coupled to a seatbelt 25 of the vehicle.

In closer detail, the base member 12 has a bottom portion 26 and an upper portion 27. The upper portion 27 extends from the bottom portion 26 at a predetermined angle relative to the bottom portion 26. Moreover, the seat 20 of the vehicle includes a backrest 29. The upper potion 27 has an outside surface 28 designed to abut the backrest 29 of the vehicle. The bottom portion 26 has an outside surface 30 designed to abut the seat 20 of the vehicle.

The base member 12 also has an upper connecting side 33 and a lower connecting side 34. The upper connecting side 33 is positioned opposite the outside surface 28 of the upper portion 27 of the base member 12. The lower connecting side 34 is positioned opposite the outside surface 30 of the bottom portion 26 of the base member 12. The base member 12 is further designed to selectively abut the second surface 16 of the seating member 11.

The base member 12 further has a pair of side walls 35. Each side wall 35 has a generally rectangular lower portion 36 that extends perpendicular from an outside edge 37 of the lower connecting side 34 of the base member 12. Each side wall 35 further has a generally triangular upper portion 38 that extends perpendicular from an outer edge 39 of the upper connecting side 33 of the base member 12.

Each side wall 35 has an opening 40 for allowing the seatbelt 25 to be threaded through the base member 12. Each opening 40 is positioned proximate the medial portion 24 of the base member 12 adjacent the connecting side 21 of the base member 12. The openings 40 are aligned with each other.

The lower portion 36 of each side wall 35 also has a side wall aperture 41 that is positioned proximate a distal end 42 of the lower portion 36 of each side wall 35. The side wall apertures 41 are aligned with each other. The seating member 11 has a seating bore 43 that extends through a distal end 44 of the lower end 18 of the seating member 11. The seating bore 43 is aligned with the side wall apertures 41.

A pivoting rod 45 is used for pivotally coupling the seating member 11 to the base member 12. The pivoting rod 45 has a diameter slightly less than a diameter of the side wall apertures 41 and the seating bore 43. The pivoting rod 45 is selectively received in the side wall apertures 41 and the seating bore 43. Thus the lower end 18 of the seating member 11 is pivotally coupled to the lower end 23 of the base member 12.

The seating member 11 has a connecting position 31 and a use position 32. The connecting position 31 is defined when the seating member 11 is pivoted away from the base member. 11 to allow access to the connecting side 21 of the base member 12. The use position 32 is defined when the second surface 16 of the seating member 11 is pivotally positioned adjacent the connecting side 21 of the base member 11. Thus the connecting member 14 is obstructed by the seating member 11 when the seating member 11 is in the use position 32 and the connecting member 14 is unobstructed when the seating member 14 is in the connecting position 31 for allowing manipulation of the connecting member 14.

The seating member lock 13 has a generally L-shaped locking pin 46. The locking pin 46 has a grasping portion 47, an engaging portion 48 and a medial portion 49. The medial portion 49 is positioned between the grasping portion 47 and the engaging portion 48. The locking pin 46 further has a generally disk shaped biasing plate 50 that extends from the medial portion 49 of the locking pin 46.

A first tab 51 extends from the upper end 22 of the base member 12 proximate a side wall 35 of the base member 12. The first tab 51 has a first tab aperture 52. The first tab aperture 52 has a diameter slightly larger than a diameter of the locking pin 46.

A second tab 53 extends from the upper end 22 of the base member 12. The second tab 53 is positioned a predetermined distance from the first tab 51. The second tap 53 has a second tab aperture 54. The second tab aperture 54 is aligned with the first tab aperture 52. The second tab aperture 54 further has diameter slightly larger than the diameter of the locking pin 46.

The locking pin 46 is received in the first tab aperture 52 and the second tab aperture 54. The biasing plate 50 of the locking pin 46 is further positioned between the first tab 51 and the second tab 53. A biasing member 55 that has an inner diameter slightly larger than the diameter of the locking pin 46 is received around the locking pin 46. The biasing member 55 is further positioned between the first tab 51 and the biasing plate 50. Thus the biasing member forces the engaging portion 48 of the locking pin 46 away from the second tab aperture 54 of the second tab 53.

The seating member 11 has a locking portion 56 that extends from the upper end 17 of the seating member 11 proximate the second tab 53 of the base member 12 when the seating member 11 is in the use position 32. The locking portion 56 further has a locking bore 57 that has a diameter slightly larger than the diameter of the locking pin 46. The locking bore 57 is further aligned with the second tab aperture 54 when the seating member 11 is in the use position 32.

The grasping portion 47 of the locking pin 46 is pulled back to allow the locking member to clear the locking portion 56 so the seating member 11 may be positioned in the use position 32. Moreover, the grasping portion 47 is released when the seating member 11 is in the use position 32 therein allowing the biasing member 55 to force the engaging portion 48 of the locking pin 46 in the locking bore 57. This action locks the seating member 11 to the base member 12.

The connecting member 14 further includes a base plate 58. The base plate 58 extends between the side walls 35 of the base member 12 proximate the medial portion 24 of the base member 12. The base plate 58 is further positioned proximate the connecting side 21 of the base member 12. The base plate 58 is also positioned at a predetermined angle relative to the upper connecting side 33 of the base member 12.

A plurality of connecting rods 59 extend from a first surface 60 of the base plate 58. The connecting rods 59 are positioned at a predetermined spaced distance apart from each other. Each connecting rod 59 has a distal end 61 that terminates in external threads 62. The distal end 61 of each connecting rod 59 has a diameter slightly smaller than a diameter of the rest of the connecting rod 59.

The connecting member 14 also has an upper plate 63. The upper plate 63 has a plurality of connecting plate apertures 64. Each connecting plate aperture 64 has a diameter slightly larger than a diameter of the distal ends 61 of each connecting rod 59. Each connecting plate aperture 64 also has a diameter slightly less than the diameter of the rest of the connecting rods 59. Each connecting plate aperture 64 is further positioned in the upper plate 63 to receive the distal end 61 of an associated connecting rod 59. Moreover, the distal end 61 of each connecting rod 59 is received in an associated connecting plate aperture 64.

A plurality of threaded nuts 65 are used for coupling the upper plate 63 to the connecting rods 59. Each nut 65 is adapted to threadably engage the external threads 62 of an associated connecting rod 59. Each nut is threadably engaged to the external threads 62 of an associated connecting rod 59. Thus the upper plate 63 is coupled to the base plate 58 at a predetermined distance from base plate 58 by the connecting rods 59.

The connecting member 14 further has a ratchet gear 66. The ratchet gear 66 has an upper side 67 and a lower side 68. A pair of tightening rods 69 extend from the lower side 68 of the ratchet gear 66. The tightening rods 69 extend from the ratchet gear 66 generally parallel to each other. The tightening rods 69 are further positioned a predetermined distance apart from each other. A tightening nut 70 is used for allowing manipulation of the ratchet gear 66. The tightening nut 70 is coupled to the upper side 67 of the ratchet gear 66. Moreover, a washer 71 is coupled to an upper portion 72 of each tightening rod 69.

The upper plate 63 further has a center aperture 73. The center aperture 73 is positioned in a medial portion 74 of the upper plate 63. The tightening rods 69 are received in the center aperture 73 in the upper plate upper 63. The upper plate 63 is further positioned between the ratchet gear 66 and the washer 71. Thus the tightening rods 69 are rotatably coupled to the upper plate 63.

The first surface 60 of the base plate 58 has a seating well 76 for containing a distal end 77 of each tightening rod 69. The seating well 76 is designed to receive the distal ends 77 of the tightening rods 69. Moreover, the distal ends 77 of the tightening rods are received in the seating well 76.

A pawl 78 is used for holding the ratchet gear 66 in a static position. The pawl 78 has an engaging end 79 that is designed to engage a notched edge 80 of the ratchet gear 66. The pawl further has a second end 81 and a medial portion 82 that extends between the engaging end 79 and the second end 81. The medial portion 82 of the pawl 78 is pivotally coupled to a top surface 83 of the upper plate 63.

A post 84 extends from the top surface 83 of the upper plate 63 proximate the second end 81 of the pawl 78. A biasing spring 85 is coupled between the post 84 and the second end 81 of the pawl 78. Thus the biasing spring 85 forces the engaging end 79 of pawl 78 to engage the notched edge 80 of the ratchet gear 69.

The seatbelt 25 of the vehicle is received between the tightening rods 69. The ratchet gear 69 is turned which causes the seatbelt 25 to be wound around the tightening rods 69 thereby coupling the base member 12 to the seat 20 of the vehicle.

In use, the outside surface 19 of the base member 12 is positioned to abut the seat 20 of the vehicle. The seating member 11 is then placed in the connecting position 31. The vehicle's seatbelt 25 is engaged and then positioned between the tightening rods 69. The tightening nut 70 is then turned with a wrench to secure the seatbelt 25 to the base member 12. Once the base member 12 is tightly secured to the seat 20 of the vehicle, the seating member 11 is pivoted to its use position 32. The seating member lock 13 is then engaged thereby coupling the seating member 11 to the base member 12. The child restraining seat 10 is then ready for use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child seat for a seat of a vehicle wherein the seat of the vehicle is of the type having a seatbelt and backrest, said child seat comprising:

a seating member, said seating member having a first surface adapted to abut the body of a child and a second surface positioned opposite said first surface, said seating member further having an upper end and a lower end;

a base member, said base member having an outside surface adapted to abut said seat of said vehicle, said base member further having a connecting side, said connecting side being positioned opposite said outside surface, said base member further having an upper end, a lower end and a medial portion, said medial portion being positioned in between said upper end and said lower end of said base member;

said connecting side of said base member being adapted to selectively abut said second surface of said seating member, said lower end of said seating member further being pivotally coupled to said lower end of said base member;

a seating member lock for selectably securing said upper end of said seating member to said upper end of said base member, said seating member lock being coupled to said upper end of said base member, said seating locking member being selectably engaged to said upper end of said seating member; and a connecting member for coupling said base member to said seatbelt of said vehicle, said connecting member being coupled to said connecting side of said base member proximate said medial portion of said base member, said connecting member further being selectably coupled to said seat belt of said vehicle;

wherein said base member further includes a bottom portion and an upper portion, said upper portion extending from said bottom portion at a predetermined angle relative to said bottom portion, said upper potion having an outside surface adapted to abut said backrest of said vehicle, said bottom portion having an outside surface adapted to abut said seat of said vehicle, an upper connecting side and a lower connecting side, said upper connecting side being positioned opposite said outside surface of said upper portion of said base member, said lower connecting side being positioned opposite said outside surface of said bottom portion of said base member, said base member further being adapted to selectively abut said second surface of said seating member, and a pair of side walls, each said side wall having a lower portion extending perpendicular from an outside edge of said lower connecting side of said base member, each said side wall further having a upper portion extending perpendicular from an outer edge of said upper connecting side of said base member;

said lower portion of each said side wall having a side wall aperture positioned proximate a distal end of said lower portion of each said side walls, said side wall apertures being aligned with each other;

said seating member having a seating bore extending through a distal end of said lower end of said seating member, said seating bore being aligned with said side wall apertures; and a pivoting rod for pivotally coupling said seat member to said base member, said pivoting rod having a diameter slightly less than a diameter of said side wall apertures and said seating bore, said pivoting rod being selectively received in said side wall apertures and said seating bore wherein said lower end of said seating member is pivotally coupled to said distal end of said lower end of said base member.

2. The child seat of claim 1 further comprising:

said seating member having a connecting position and a use position, said connecting position being defined when said seating member is pivoted away from said base member to allow access to said connecting side of said base member, said use position being defined when said second surface of said seating member is pivotally positioned adjacent said connecting side of said base member, and wherein said connecting member is obstructed by said seating member when said seating member is in said use position and said connecting member is unobstructed when said seating member is in said connecting position for allowing manipulation of said connecting member.

3. The child seat of claim 1 further comprising:

each said side wall having an opening for allowing said seatbelt to be threaded through said base member, each said opening being positioned proximate said medial portion of said base member adjacent said connecting side of said base member, said openings further being aligned with each other.

4. The child seat of claim 1 wherein said lower portion of said side walls are generally rectangular in shape.

5. The child seat of claim 1 wherein said upper portion of said side walls are generally triangular in shape.

6. A child seat for a seat of a vehicle wherein the seat of the vehicle is of the type having a seatbelt and backrest, said child seat comprising:

a seating member, said seating member having a first surface adapted to abut the body of a child and a second surface positioned opposite said first surface, said seating member further having an upper end and a lower end;

a base member, said base member having an outside surface adapted to abut said seat of said vehicle, said base member further having a connecting side, said connecting side being positioned opposite said outside surface, said base member further having an upper end, a lower end and a medial portion, said medial portion being positioned in between said upper end and said lower end of said base member;

said connecting side of said base member being adapted to selectively abut said second surface of said seating member, said lower end of said seating member further being pivotally coupled to said lower end of said base member;

a seating member lock for selectably securing said upper end of said seating member to said upper end of said base member, said seating member lock being coupled to said upper end of said base member, said seating locking member being selectably engaged to said upper end of said seating member;

a connecting member for coupling said base member to said seatbelt of said vehicle, said connecting member being coupled to said connecting side of said base member proximate said medial portion of said base member, said connecting member further being selectably coupled to said seat belt of said vehicle;

wherein said seating member lock further includes a generally L-shaped locking pin, said locking pin having a grasping portion, an engaging portion and a medial portion, said medial portion being positioned between said grasping portion and said engaging portion, said locking pin further having a generally disk shaped biasing plate extending from said medial portion of said locking pin, a first tab extending from said upper end of said base member proximate a side wall of said base member, said first tab having a first tab aperture, said first tab aperture further having a diameter slightly larger than a diameter of said locking pin, a second tab extending from said upper end of said base member, said second tab being positioned a predetermined distance from said first tab, said second tap having a second tab aperture, said second tab aperture being aligned with said first tab aperture, said second tab aperture further having a diameter slightly larger than said diameter of said locking pin, said locking pin being received in said first tab aperture and said second tab aperture, said biasing plate of said locking pin further being positioned between said first tab and said second tab, a biasing member, said biasing member having an inner diameter slightly larger than the diameter of said locking pin, said biasing member being received around said locking pin, said biasing member further being positioned between said first tab and said biasing plate wherein said biasing member forces said engaging portion of said locking pin away from said second tab aperture of said second tab, said seating member having a locking portion extending from said upper end of said seating member proximate said second tab of said base member when said seating member is in said use position, said locking portion further having a locking bore, said locking bore having a diameter slightly larger than said diameter of said locking pin, said locking bore further being aligned with said second tab aperture when said seating member is in said use position, and wherein said grasping portion of said locking pin is pulled back to allow said seating member to be positioned in said use position and said grasping portion is released when said seating member is in said use position therein allowing said biasing member to force said engaging portion of said locking pin in said locking bore thereby locking said seating member to said base member.

7. A child seat for a seat of a vehicle wherein the seat of the vehicle is of the type having a seatbelt and backrest, said child seat comprising:

a seating member, said seating member having a first surface adapted to abut the body of a child and a second surface positioned opposite said first surface, said seating member further having an upper end and a lower end;

a base member, said base member having an outside surface adapted to abut said seat of said vehicle, said base member further having a connecting side, said connecting side being positioned opposite said outside surface, said base member further having an upper end, a lower end and a medial portion, said medial portion being positioned in between said upper end and said lower end of said base member;

said connecting side of said base member being adapted to selectively abut said second surface of said seating member, said lower end of said seating member further being pivotally coupled to said lower end of said base member;

a seating member lock for selectably securing said upper end of said seating member to said upper end of said base member, said seating member lock being coupled to said upper end of said base member, said seating locking member being selectably engaged to said upper end of said seating member;

a connecting member for coupling said base member to said seatbelt of said vehicle, said connecting member being coupled to said connecting side of said base member proximate said medial portion of said base member, said connecting member further being selectably coupled to said seat belt of said vehicle;

wherein said base member further includes
 a bottom portion and an upper portion, said upper portion extending from said bottom portion at a predetermined angle relative to said bottom portion, said upper potion having an outside surface adapted to abut said backrest of said vehicle, said bottom portion having an outside surface adapted to abut said seat of said vehicle,
 an upper connecting side and a lower connecting side, said upper connecting side being positioned opposite said outside surface of said upper portion of said base member,
 said lower connecting side being positioned opposite said outside surface of said bottom portion of said base member, said base member further being adapted to selectively abut said second surface of said seating member, and
 a pair of side walls, each said side wall having a lower portion extending perpendicular from an outside edge of said lower connecting side of said base member, each said side wall further having a upper portion extending perpendicular from an outer edge of said upper connecting side of said base member; and wherein said connecting member further includes
 a base plate, said base plate extending between said side walls of said base member proximate said medial portion of said base member, said base plate further being positioned proximate said connecting side of said base member, said base plate also being positioned at a predetermined angle relative to said upper connecting side of said base member,
 a plurality of connecting rods extending from a first surface of said base plate, said connecting rods being positioned at a predetermined spaced distance apart from each other, each said connecting rod having a distal end that terminates in external threads, said distal end of each said connecting rod having a diameter slightly smaller than a diameter of said connecting rod,
 an upper plate, said upper plate having a plurality of connecting plate apertures, each said connecting plate aperture having a diameter slightly larger than a diameter of said distal ends of each said connecting rod, each said connecting plate aperture further having a diameter slightly less than said diameter of said connecting rods, each said connecting plate aperture further being positioned in said upper plate to receive said distal end of an associated said connecting rod, said distal end of each said connecting rod being received in an associated said connecting plate apertures,
 a plurality of threaded nuts for coupling said upper plate to said connecting rods, each said nut being adapted to threadably engage said external threads of an associated said connecting rods, each said nut being threadably engaged to said external threads of an associated said connecting rod wherein said upper plate is coupled to said base plate at a predetermined distance from said base plate by said connecting rods,
 said upper plate further having a center aperture, said center aperture being positioned in a medial portion of said upper plate,
 a ratchet gear, said ratchet gear having an upper side and a lower side,
 a pair of tightening rods extending from said lower side of said ratchet gear, said tightening rods extending generally parallel with each other, said tightening rods further being positioned a predetermined distance apart from each other,
 a tightening nut for allowing manipulation of said ratchet gear, said tightening nut being coupled to said upper side of said ratchet gear,
 a washer, said washer being coupled to an upper portion of each said tightening rod,
 said tightening rods being received in said center aperture in said upper plate, said upper plate further being positioned between said ratchet gear and said washer wherein said tightening rods are rotatably coupled to said upper plate,
 said first surface of said base plate having a seating well for containing a distal end of each said tightening rod, said seating well being adapted to receive said distal ends of said tightening rods, said distal ends of said tightening rods being received in said seating well,
 a pawl for holding said ratchet gear in a static position, said pawl having an engaging end adapted to engage a notched edge of said ratchet gear, said pawl further having a second end and a medial portion, said medial portion extending between said engaging end and said second end, said medial portion of said pawl being pivotally coupled to a top surface of said upper plate,
 a post extending from said top surface of said upper plate proximate said second end of said pawl,
 a biasing spring, said biasing spring being coupled between said post and said second end of said pawn wherein said biasing spring forces said engaging end of said pawl to engage said notched edge of said ratchet gear, and said seatbelt of said vehicle being received between said tightening rods, said ratchet gear being turned wherein said seatbelt is wound around said tightening rods thereby coupling said base member to said seat of said vehicle.

8. The child restraining seat of claim 6 further comprising:

said seating member having a connecting position and a use position, said connecting position being defined when said seating member is pivoted away from said base member to allow access to said connecting side of said base member, said use position being defined when said second surface of said seating member is pivotally positioned adjacent said connecting side of said base member;

wherein said connecting member is obstructed by said seating member when said seating member is in said use position and said connecting member is unobstructed when said seating member is in said connecting position for allowing manipulation of said connecting member;

said base member further including a bottom portion and an upper portion, said upper portion extending from said bottom portion at a predetermined angle relative to said bottom portion, said upper potion having an outside surface adapted to abut said backrest of said vehicle, said bottom portion having an outside surface adapted to abut said seat of said vehicle;

said base member further including an upper connecting side and a lower connecting side, said upper connecting side being positioned opposite said outside surface of said upper portion of said base member;

said lower connecting side being positioned opposite said outside surface of said bottom portion of said base member, said base member further being adapted to selectively abut said second surface of said seating member;

said base member further having a pair of side walls, each said side wall having a generally rectangular lower portion extending perpendicular from an outside edge of said lower connecting side of said base member, each said side wall further having a generally triangular upper portion extending perpendicular from an outer edge of said upper connecting side of said base member;

said lower portion of each said side wall having a side wall aperture positioned proximate a distal end of said lower portion of each said side walls, said side wall apertures being aligned with each other;

said seating member having a seating bore extending through a distal end of said lower end of said seating member, said seating bore being aligned with said side wall apertures;

a pivoting rod for pivotally coupling the seating member to the base member, said pivoting rod having a diameter slightly less than a diameter of said side wall apertures and said seating bore, said pivoting rod being selectively received in said side wall apertures and said seating bore wherein said lower end of said seating member is pivotally coupled to said distal end of said lower end of said base member;

said connecting member including a base plate, said base plate extending between said side walls of said base member proximate said medial portion of said base member, said base plate further being positioned proximate said connecting side of said base member, said base plate also being positioned at a predetermined angle relative to said upper connecting side of said base member;

a plurality of connecting rods extending from a first surface of said base plate, said connecting rods being positioned at a predetermined spaced distance apart from each other, each said connecting rod having a distal end that terminates in external threads, said distal end of each said connecting rod having a diameter slightly smaller than a diameter of said connecting rod;

an upper plate, said upper plate having a plurality of connecting plate apertures, each said connecting plate aperture having a diameter slightly larger than a diameter of said distal ends of each said connecting rod, each said connecting plate aperture further having a diameter slightly less than a diameter of said connecting rods, each said connecting plate aperture further being positioned in said upper plate to receive said distal end of an associated said connecting rod, said distal end of each said connecting rod being received in an associated said connecting plate aperture;

a plurality of threaded nuts for coupling said upper plate to said connecting rods, each said nut being adapted to threadably engage said external threads of an associated said connecting rods, each said nut being threadably engaged to said external threads of an associated said connecting rod wherein said upper plate is coupled to said base plate at a predetermined distance from said base plate by said connecting rods;

said upper plate further having a center aperture, said center aperture being positioned in a medial portion of said upper plate;

a ratchet gear, said ratchet gear having an upper side and a lower side;

a pair of tightening rods extending from said lower side of said ratchet gear, said tightening rods extending generally parallel with each other, said tightening rods further being positioned a predetermined distance apart from each other;

a tightening nut for allowing manipulation of said ratchet gear, said tightening nut being coupled to said upper side of said ratchet gear;

a washer, said washer being coupled to an upper portion of each said tightening rod;

said tightening rods being received in said center aperture in said upper plate, said upper plate further being positioned between said ratchet gear and said washer wherein said tightening rods are rotatably coupled to said upper plate;

said first surface of said base plate having a seating well for containing a distal end of each said tightening rod, said seating well being adapted to receive said distal ends of said tightening rods, said distal ends of said tightening rods being received in said seating well;

a pawl for holding said ratchet gear in a static position, said pawl having an engaging end adapted to engage a notched edge of said ratchet gear, said pawl further having a second end and a medial portion, said medial portion extending between said engaging end and said second end, said medial portion of said pawl being pivotally coupled to a top surface of said upper plate;

a post extending from said top surface of said upper plate proximate said second end of said pawl;

a biasing spring, said biasing spring being coupled between said post and said second end of said pawn wherein said biasing spring forces said engaging end of said pawl to engage said notched edge of said ratchet gear; and said seatbelt of said vehicle being received between said tightening rods, said ratchet gear being turned wherein said seatbelt is wound around said tightening rods thereby coupling said base member to said seat of said vehicle.

9. The child seat of claim 7 further comprising:

said seating member having a connecting position and a use position, said connecting position being defined when said seating member is pivoted away from said base member to allow access to said connecting side of said base member, said use position being defined when said second surface of said seating member is pivotally positioned adjacent said connecting side of said base member, and wherein said connecting member is obstructed by said seating member when said seating member is in said use position and said connecting member is unobstructed when said seating member is in said connecting position for allowing manipulation of said connecting member.

10. The child seat of claim 7 further comprising:

each said side wall having an opening for allowing said seatbelt to be threaded through said base member, each said opening being positioned proximate said medial portion of said base member adjacent said connecting side of said base member, said openings further being aligned with each other.

11. The child seat of claim 7 wherein said lower portion of said side walls are generally rectangular in shape.

12. The child seat of claim 7 wherein said upper portion of said side walls are generally triangular in shape.

* * * * *